United States Patent
Tomonari et al.

(10) Patent No.: US 11,702,560 B2
(45) Date of Patent: Jul. 18, 2023

(54) TITANIUM DIOXIDE AQUEOUS DISPERSION AND METHOD FOR PRODUCING SAME

(71) Applicant: ISHIHARA SANGYO KAISHA, LTD., Osaka (JP)

(72) Inventors: Masanori Tomonari, Osaka (JP); Satoshi Nagamori, Osaka (JP); Yuto Kameda, Osaka (JP)

(73) Assignee: ISHIHARA SANGYO KAISHA, LTD., Osaka (JP)

( * ) Notice: Subject to any disclaimer, the term of this patent is extended or adjusted under 35 U.S.C. 154(b) by 7 days.

(21) Appl. No.: 16/963,889

(22) PCT Filed: Jan. 28, 2019

(86) PCT No.: PCT/JP2019/002744
§ 371 (c)(1),
(2) Date: Jul. 22, 2020

(87) PCT Pub. No.: WO2019/146783
PCT Pub. Date: Aug. 1, 2019

(65) Prior Publication Data
US 2020/0347256 A1 Nov. 5, 2020

(30) Foreign Application Priority Data

Jan. 29, 2018 (JP) .................. 2018-012385

(51) Int. Cl.
| | | |
|---|---|---|
| *C09D 17/00* | (2006.01) | |
| *C09D 5/02* | (2006.01) | |
| *C09D 7/62* | (2018.01) | |
| *C09D 7/63* | (2018.01) | |
| *C09D 7/45* | (2018.01) | |
| *C09C 1/36* | (2006.01) | |

(52) U.S. Cl.
CPC .......... *C09D 17/008* (2013.01); *C09C 1/3669* (2013.01); *C09D 5/02* (2013.01); *C09D 7/45* (2018.01); *C09D 7/62* (2018.01); *C09D 7/63* (2018.01); *C09D 17/001* (2013.01); *C01P 2004/32* (2013.01); *C01P 2004/54* (2013.01); *C01P 2004/84* (2013.01); *C01P 2006/80* (2013.01)

(58) Field of Classification Search
CPC .............. C01P 2002/84; C01P 2004/32; C01P 2004/54; C01P 2004/64; C01P 2004/84; C01P 2006/80; C08K 2003/2213; C08K 2003/2227; C08K 2003/2241; C08K 2003/2265; C08K 2003/2296; C08K 3/36; C09D 17/001; C09D 17/008; C09D 201/00; C09D 5/02; C09D 7/45; C09D 7/62; C09D 7/63; C09D 17/00; C09D 5/028; C09G 1/02; G11B 2007/24308; G11B 2007/24316; G11B 2007/24328; G11B 7/243; G11B 7/2534; G11B 7/257; G11B 7/26; Y10S 428/913; Y10S 430/146; Y10S 430/165; Y10T 428/239; Y10T 428/31678; A61K 8/29; A61Q 19/00; C09C 1/3661; C09C 1/3669; C09C 1/3692; C09C 1/3607
See application file for complete search history.

(56) References Cited

U.S. PATENT DOCUMENTS

| | | | |
|---|---|---|---|
| 4,981,882 A * | 1/1991 | Smith .................. | C08F 291/00 47/1.7 |
| 2003/0072122 A1 | 4/2003 | Ishida | |
| 2008/0044483 A1* | 2/2008 | Kessell ................ | A61Q 17/04 424/498 |
| 2014/0199251 A1 | 7/2014 | Sakai | |
| 2016/0251524 A1* | 9/2016 | Kohyama .............. | C09D 5/00 524/533 |
| 2017/0035681 A1 | 2/2017 | Toray | |

FOREIGN PATENT DOCUMENTS

| | | |
|---|---|---|
| CN | 1211272 | 3/1999 |
| JP | 7-247119 | 9/1995 |
| JP | 2007-262229 | 10/2007 |
| JP | 2008-150299 | 7/2008 |

(Continued)

OTHER PUBLICATIONS

Search Report and Written Opinion issued in PCT/JP2019/002744, dated Mar. 20, 2019, pp. 1-4, translation is ISR, pp. 1-2.

(Continued)

*Primary Examiner* — Shuangyi Abu Ali
(74) *Attorney, Agent, or Firm* — Jeffrey S. Melcher; Melcher Patent Law PLLC

(57) ABSTRACT

Provided are a titanium dioxide aqueous dispersion having high dispersibility and little aggregation or coarse particles, and a method for producing the same. The titanium dioxide aqueous dispersion contains titanium dioxide particles having a hydrophobic compound such as a higher fatty acid or a salt thereof on the surface, an aqueous dispersion medium, a nonionic surfactant having an HLB value of 10 or higher, and a basic compound such as an alkanolamine, and the pH is in the 8.5-13 range. The method for producing a titanium dioxide aqueous dispersion has a step for mixing the titanium dioxide particles having a hydrophobic compound on the surface, the aqueous dispersion medium, the nonionic surfactant having an HLB value of 10 or higher, and the basic compound to bring the pH of the aqueous dispersion into the 8.5-13 range.

11 Claims, No Drawings

(56) References Cited

FOREIGN PATENT DOCUMENTS

| | | |
|---|---|---|
| JP | 2013-028563 | 2/2013 |
| JP | 2013-209306 | 10/2013 |
| JP | 2015-203026 | 11/2015 |
| JP | 2016-222589 | 12/2016 |
| WO | 2013/018827 | 2/2013 |
| WO | 2017/073973 | 5/2017 |
| WO | 2017/109213 | 6/2017 |

OTHER PUBLICATIONS

Office Action issued in corresponding Chinese Application No. 201980010432.1, dated Dec. 29, 2021, pp. 1-10.
Search Report issued in corresponding European Patent Application No. 19743870.8, dated Oct. 5, 2021, pp. 1-8.
Second Office Action issued in corresponding Chinese Application No. 201980010432.1, dated Jul. 12, 2022, pp. 1-9, including machine translation.
Production and Application of Nano Titanium Dioxide, 1st Edition, Wang Ako et al., Squibb Science Press, p. 57, Jul. 31, 2014, including machine translation.

\* cited by examiner

TITANIUM DIOXIDE AQUEOUS DISPERSION AND METHOD FOR PRODUCING SAME

TECHNICAL FIELD

The present invention relates to an aqueous dispersion of titanium dioxide particles, and the method for producing the same.

BACKGROUND ART

Titanium dioxide particles having a particle size of approximately 3 to 200 nm have excellent visible light transparency and ultraviolet shielding properties as well as high safety, and therefore are used for cosmetics, paints, inks, chemical fibers, polishing compositions, and the like.

Such a fine titanium dioxide has the property that primary particles easily agglomerate, and when the primary particles agglomerate, the above-described properties (e.g., visible light transparency and ultraviolet shielding properties) reduce. Thus, a material (i.e., dispersion) in which titanium dioxide particles are dispersed in a dispersion medium is in advance prepared, and this dispersion is used for applying titanium dioxide particles to various types of uses.

For example, Patent Literature 1 describes an aqueous dispersion containing titanium dioxide ultrafine particles subjected to hydrophobic treatment with stearic acid or the like, and a nonionic surfactant. Patent Literature 1 describes that such an aqueous dispersion can suppress agglomeration of titanium dioxide ultrafine particles and achieve sufficient visible light transparency and ultraviolet shielding properties, even in the case where the aqueous dispersion is applied to a composition containing an electrolyte component (e.g., cosmetics).

In addition, Patent Literature 2 describes an aqueous dispersion containing spindle-shaped titanium dioxide ultrafine particles subjected to water-repellent treatment with silicone or the like, and a dispersant having an HLB value of 10 to 17, in which the contents of the titanium dioxide ultrafine particles, the dispersant, and water are 80 mass % or more relative to the total amount of the dispersion. Patent Literature 2 describes that such an aqueous dispersion enables even dispersion of titanium dioxide ultrafine particles subjected to water-repellent treatment in the aqueous dispersion medium, and thus can achieve a moisturizing feeling and a good makeup feeling in O/W-type emulsified cosmetics to which this aqueous dispersion was blended.

CITATION LIST

Patent Literatures

PATENT LITERATURE 1: JPH 07-247119 A
PATENT LITERATURE 2: WO 2013/018827 A1

SUMMARY OF INVENTION

Technical Problem

In recent years, there has been a demand for further enhancement of visible light transparency and ultraviolet shielding properties of titanium dioxide aqueous dispersion in the field of cosmetics. To realize this, a highly dispersed aqueous dispersion of titanium dioxide particles, in which agglomeration of titanium dioxide primary particles is further suppressed, has been demanded. Not only in the field of cosmetics, but also in the various types of fields that employ aqueous dispersion of titanium dioxide ultrafine particles, a demand for a highly dispersed aqueous dispersion exists. It is difficult to fulfill such a demand by the above-described conventional aqueous dispersions of titanium dioxide ultrafine particles.

Solution to Problem

As a result of intensive studies to fulfill the above-described requirement, the present inventors have found that, in the aqueous dispersion containing titanium dioxide particles having a hydrophobic compound on their surfaces and a predetermined dispersant, a highly dispersed titanium dioxide aqueous dispersion in which agglomeration and coarse particles are little can be obtained by setting the pH of the aqueous dispersion to a specific range, and thus completed the present invention.

That is, the present invention encompasses the following inventions:

(1) A titanium dioxide aqueous dispersion comprising a titanium dioxide particle having a hydrophobic compound on the surface of the titanium dioxide particle, an aqueous dispersion medium, a nonionic surfactant having an HLB value of 10 or more, and a basic compound, wherein a pH of the titanium dioxide aqueous dispersion is in a range of 8.5 to 13.

(2) The titanium dioxide aqueous dispersion according to (1), wherein the basic compound is alkanolamine.

(3) The titanium dioxide aqueous dispersion according to (1) or (2), wherein the hydrophobic compound is a higher fatty acid or a salt of the higher fatty acid.

(4) The titanium dioxide aqueous dispersion according to any one of (1) to (3), wherein the titanium dioxide particle contains lead as an impurity, and a content of the lead is 3 ppm or less.

(5) The titanium dioxide aqueous dispersion according to any one of (1) to (4), wherein the titanium dioxide particle is a spherical-shaped particle having an aspect ratio of 3 or less.

(6) The titanium dioxide aqueous dispersion according to any one of (1) to (5), wherein the titanium dioxide particle has the hydrophobic compound on the surface of the titanium dioxide particle being coated with an oxide or a hydroxide of at least one type of zinc, titanium, cerium, iron, silicon, and aluminum.

(7) A method for producing a titanium dioxide aqueous dispersion, comprising mixing a titanium dioxide particle having a hydrophobic compound on the surface, an aqueous dispersion medium, a nonionic surfactant having an HLB value of 10 or more, and a basic compound to bring a pH of the aqueous dispersion into a range of 8.5 to 13.

(8) The method for producing a titanium dioxide aqueous dispersion according to (7), wherein the basic compound is alkanolamine.

Advantageous Effects of Invention

The present invention can provide a titanium dioxide aqueous dispersion having high dispersibility, and little agglomeration and coarse particles, the titanium dioxide aqueous dispersion having performances such as excellent visible light transparency, and ultraviolet shielding properties. Further, such an aqueous dispersion of the present invention can easily maintain the dispersed state of titanium dioxide particles even when an electrolyte component, a paint component, or an ink component is added according to used situations, or the pH of the aqueous dispersion is changed. Thus, the aqueous dispersion of the present invention can be used for production of various types of compositions for cosmetics or the like.

DESCRIPTION OF EMBODIMENTS

The aqueous dispersion of the present invention contains titanium dioxide particles. The average primary particle size of titanium dioxide particles is preferably 3 to 200 nm, more preferably 5 to 100 nm, and even more preferably 10 to 100 nm. Titanium dioxide particles having such a particle size have high visible light transparency and a favorable ultraviolet shielding range. The average primary particle size of titanium dioxide particles is determined by measuring the particle sizes of 200 particles randomly selected under an electron microscope, and calculating the average value of the particle sizes (this is also referred to as "electron micrograph method" in the present application).

The shape of the titanium dioxide particles is not particularly limited, and particles having any shape, for example, spherical-shaped particles, rod-shaped particles, acicular-shaped particles, spindle-shaped particles, and plate-shaped particles can be used. For the average primary particle size of particles having a shape other than the spherical shape, in the case of the rod-shaped particles, acicular-shaped particles, and spindle-shaped particles, the average primary particle size is defined by the average of lengths of the short axis side, whereas in the case of the plate-shaped particles, the average primary particle size is defined by the average of lengths of the diagonal line on the surface. The ratio of the long axis diameter to the short axis diameter of titanium dioxide particles refers to an aspect ratio. The aspect ratio is preferably 3 or less, and more preferably 1 to 2. The aspect ratio of titanium dioxide particles is calculated as the average value of the long axis diameter to the short axis diameter of 200 particles randomly selected under an electron microscope.

The crystal structure of titanium dioxide particles is not particularly limited, and for example, an anatase-type, a rutile-type, or a brookite-type can be used. From the perspective of suppressing photocatalytic activity, the rutile-type is preferably used. Titanium dioxide particles may also be, in addition to titanium dioxide ($TiO_2$), a compound represented by metatitanate ($TiO_2 \cdot nH_2O$), and orthotitanate ($Ti(OH)_4$).

Titanium dioxide particles can be produced by various types of well-known methods. As the method for producing the above-described titanium dioxide particles having a relatively small average primary particle size, for example, the following methods can be employed: a method in which a titanium tetrachloride aqueous solution is hydrolyzed by neutralization using alkaline, and the resulting hydrous titanium dioxide is calcined (this is also referred to as "calcination process" in the present application), and a method in which a titanium tetrachloride aqueous solution is hydrolyzed by neutralization using alkaline, the resulting hydrous titanium dioxide is heat treated with sodium hydroxide, and the resulting reaction product is heated and aged with acid (this is also referred to as "wet process" in the present application). In general, spherical-shaped titanium dioxide particles can be obtained by the above calcination process, and spindle-shaped titanium dioxide particles can be obtained by the above wet process. Further, rutile-type titanium dioxide particles can be obtained by the calcination process and the wet process. Moreover, titanium dioxide particles obtained by the calcination process have an aspect ratio of approximately 3 or less. Preferably, spherical-shaped particles having an aspect ratio of 1 to 2 can be obtained.

In the spherical-shaped titanium dioxide particles obtained by the calcination process, crystallinity is enhanced by calcination, and thus photocatalytic activity is highly suppressed. Thus, in uses that require suppression in photocatalytic activity (e.g., cosmetics), use of spherical-shaped titanium dioxide particles obtained by the calcination process is preferred.

Titanium dioxide particles may contain various types of impurities that are unavoidable for their production. Examples of impurity elements include Al, Ca, Co, Cr, Cu, Fe, K, Mg, Mn, Na, Ni, Zn, Zr, Ag, Pb, Cl, and Nb. Here, among the impurity elements, the lead (Pb) content is preferably 3 ppm or less based on the mass of $TiO_2$. An atomic absorption spectrophotometer is used for measurement of the contents of impurity elements such as lead (Pb).

In the case of using the titanium dioxide aqueous dispersion of the present invention for cosmetics, an influence on the human body can be minimized by decreasing the lead content to a very small level (specifically, 3 ppm or less). Further, in the case where the titanium dioxide aqueous dispersion of the present invention is used for uses other than cosmetics and released to the natural environment (e.g., the case of using the titanium dioxide aqueous dispersion for disposable substances such as a polishing composition), load on the environment can be reduced.

As the method that can efficiency provide titanium dioxide particles having a lead (Pb) content of the above range, a calcination process or a wet process that employs the above-described titanium tetrachloride as a starting material is exemplified.

Titanium dioxide particles may also be ones, their surfaces being coated with other inorganic compound different from the titanium dioxide particle. Well-known inorganic surface treatment materials can be used for a coating material. For example, an oxide or hydroxide of at least one type of zinc, titanium, cerium, iron, silicon, and aluminum can be used. The coating amount is preferably 1% to 30% based on the mass of $TiO_2$. Titanium dioxide particles have photocatalytic activity, but the photocatalytic activity can be suppressed when the titanium dioxide particles are coated with the inorganic compound. In such uses (e.g., cosmetics), titanium dioxide particles coated with the inorganic compound are preferred.

Titanium dioxide particles in the aqueous dispersion of the present invention have a hydrophobic compound on their surfaces. The hydrophobic compound is present on the surfaces of titanium dioxide particles and reduces the affinity of titanium dioxide particles with water. A compound having a hydrocarbon group in a molecule is a representative example of the hydrophobic compound. Examples of the hydrophobic compound that can be used include siloxanes such as dimethylpolysiloxane, methyl hydrogen polysiloxane, and organic modified silicone oil; coupling agents such as silane-based coupling agents, titanate-based coupling agents, aluminum-based coupling agents, and fluorine based-coupling agents; higher fatty acids or salts thereof; higher alcohols; and amines having a higher alkyl group.

As the hydrophobic compound, higher fatty acids (specifically, monovalent carboxylic acid having 12 or more carbon atoms) or salts thereof are preferred. By using the higher fatty acid, the dispersibility of titanium dioxide particles in the aqueous dispersion can be further enhanced. Examples of the higher fatty acid include saturated fatty acids (e.g., lauric acid, myristic acid, palmitic acid, and stearic acid), and unsaturated fatty acids (e.g., oleic acid), and among them, stearic acid is preferred. As the salt of higher fatty acid, the salt of sodium, potassium, ammonium, or the like is preferred.

The coating amount of the hydrophobic compound is preferably an amount that can uniformly coat titanium dioxide particles. Specifically, the coating amount is preferably 0.5 to 12%, and more preferably 0.5 to 8%, and even more preferably 2 to 5% based on the mass of $TiO_2$. The coating amount within such a range allows titanium dioxide particles to be uniformly coated and ensure sufficient dispersibility and stability over time in the aqueous dispersion. Further, by controlling the coating amount not to be excessive, generation of foams in the aqueous dispersion, caused by release of extra hydrophobic compounds can be avoided. The hydrophobic compound can be coated on the surfaces of titanium dioxide particles by, for example, mixing the hydrophobic compound and titanium dioxide particles.

Titanium dioxide particles coated with the above hydrophobic compound are preferably allowed to be contained in the aqueous dispersion in a proportion of 10 to 70 mass %. A proportion of 10 mass % or more of the titanium dioxide particles allows suppression in the amount of the aqueous dispersion of the present invention blended in various types of aqueous compositions. A proportion of 70 mass % or less of the titanium dioxide particles ensures flowability of the aqueous dispersion, and facilitates blending of the aqueous dispersion into various types of aqueous compositions. The upper limit is more preferably 60 mass %, and even more preferably 55 mass % or less. Further, the lower limit is more preferably 15 mass %, and even more preferably 20 mass %. Further, the lower limit is even more preferably 25 mass % from the viewpoint of the production efficiency of the aqueous dispersion.

Titanium dioxide particles coated with a hydrophobic compound in the aqueous dispersion of the present invention are dispersed in an aqueous dispersion medium. The aqueous dispersion medium in the present invention contains water as a main component, that is, the water content is 50 mass % or more, preferably 80 mass % or more, more preferably 90 mass % or more, and even more preferably 100 mass %. Water is preferably pure water from the viewpoint of enhancing the dispersibility of titanium dioxide particles. Examples of the component other than water include organic solvents that are dissolved in water, such as methanol, ethanol, isopropanol, butanol, acetone, methyl ethyl ketone, and tetrahydrofuran.

The titanium dioxide aqueous dispersion of the present invention contains a nonionic surfactant having an HLB value of 10 or more. The hydrophilic-lipophilic balance (HLB) value refers to a value that represents the level of affinity of the surfactant with water and oil (i.e., organic compound insoluble in water), and an HLB value of 10 or more indicates high-hydrophilic property.

Examples of the nonionic surfactant include polyoxyalkylene alkyl ethers, polyoxyalkylene fatty acid esters, polyoxyalkylene sorbitan fatty acid esters, polyoxyalkylene castor oils, polyoxyalkylene cured castor oils, polyoxyalkylene sorbitol tetra fatty acid esters, glycerin fatty acid esters, sorbitan fatty acid esters, polyglycerin fatty acid esters, polyoxyalkylene derivatives, sucrose fatty acid esters, organopolysiloxanes having a polyoxyalkylene group, organopolysiloxanes having a polyglycerin group, and organopolysiloxanes having a sugar chain. Among various types of nonionic surfactants exemplified above, the nonionic surfactant of the present invention is a nonionic surfactant having an HLB value of 10 or more, that is, a nonionic surfactant having an HLB range of 10 to 20. Such a nonionic surfactant causes interactions, for example, the interactions that bind the hydrophobic group of the nonionic surfactant contained in the titanium dioxide aqueous dispersion of the present invention with the hydrophobic compound of titanium dioxide particles, and that bind the hydrophilic group of the nonionic surfactant binds with $OH^-$ of water molecule of the aqueous dispersion medium, whereby the titanium dioxide particles can be evenly and favorably dispersed in the aqueous dispersion. As the nonionic surfactant, organopolysiloxanes having a polyoxyalkylene group, polyoxyalkylene derivatives, or polyoxyalkylene fatty acid esters are preferably used. Examples of the organopolysiloxane having a polyoxyalkylene group include polyethyleneglycol methyl ether dimethicone, and polyethyleneglycol dimethicone. Examples of the polyoxyalkylene derivative include polyoxyalkylene alkyl ethers, polyoxyethylene distyrenated phenyl ethers, polyoxyethylene styrenated phenyl ethers, polyoxyethylene tribenzylphenyl ethers, polyoxyalkylene decylethers, and polyoxyethylene tridecylethers. Examples of the polyoxyalkylene fatty acid ester include polyethylene glycol monolaurate, polyethylene glycol monostearate, polyethylene glycol distearate, polyethylene glycol monooleate, and polyoxyethylene sorbitan monooleate.

The HLB value of the nonionic surfactant is preferably in a range of 13 to 19, and more preferably in a range of 13 to 16. By using a nonionic surfactant having such an HLB value, an aqueous dispersion having higher dispersibility can be achieved.

The HLB value in the present invention can be calculated by Equation (1) below.

$$HLB \text{ value} = 20 \times \text{sum of formula weights of hydrophilic moieties/molecular weight of nonionic surfactant} \qquad (1)$$

Here, in the case of the nonionic surfactant containing only a polyoxyethylene group as a hydrophilic moiety, Equation (1) may also be replaced with Equation (2) below.

$$HLB \text{ value} = \text{mass \% of polyoxyethylene group}/5 \qquad (2)$$

The above-described nonionic surfactant is preferably allowed to be contained in the aqueous dispersion in a proportion of 1 to 10 mass %. By controlling the proportion within such a range, titanium dioxide particles can be sufficiently dispersed in water (aqueous dispersion medium) while cost is suppressed.

The aqueous dispersion of the present invention further contains a basic compound. The basic compound in the present invention has a function in which at least a part of the basic compound is ionized in the aqueous dispersion, and thus the pH of the aqueous dispersion is shifted to the alkali side. That is, the basic compound of the present invention not only exists in the aqueous dispersion as the basic compound itself, but also exists in the form of ion in which the basic compound has been ionized, or in the form of the reacted product.

As such a basic compound, a basic inorganic compound or a basic organic compound can be used. Examples of the basic inorganic compound include hydroxides or various types of salts (carbonates, bicarbonates, sulphates, acetates, or chlorides) of alkaline metals or alkaline earth metals, ammonia, and ammonium salt. Specific examples of the basic inorganic compound include calcium hydroxide, potassium hydroxide, potassium carbonate, potassium bicarbonate, potassium sulfate, potassium acetate, potassium chloride, sodium hydroxide, ammonium carbonate, sodium bicarbonate, sodium carbonate, ammonium carbonate, and ammonium bicarbonate.

Examples of the basic organic compound include alkylamines, alkanolamines, and quaternary ammonium compounds. Examples of the alkylamine include propylamine. Examples of the alkanolamine include monoethanolamine, diethanolamine, and triethanolamine. Examples of the quaternary ammonium compound include hydroxides, or salts such as chlorides, carbonates, sulphates, and phosphates of tetramethylammonium, tetraethylammonium, tetrabutylammonium or the like. Specific examples thereof include tetraalkyl ammonium hydroxides such as tetramethyl ammonium hydroxide, tetraethyl ammonium hydroxide, and tetrabutyl ammonium hydroxide; and tetraalkylammonium salts such as tetramethylammonium carbonate, and tetramethylammonium chloride.

The titanium dioxide aqueous dispersion of the present invention has a pH range of 8.5 to 13. The aqueous dispersion containing titanium dioxide particles coated with a hydrophobic compound, an aqueous dispersion medium, and a nonionic surfactant typically has a pH around neutrality (specifically, pH approximately 6 to 8). The pH is adjusted so as to be in a predetermined range (i.e., 8.5 to 13) by making the basic compound contained. That is, containing the basic compound in the aqueous dispersion can be confirmed by the fact that the pH of the aqueous dispersion is within a range of 8.5 to 13. The pH of the aqueous dispersion is measured by using a pH meter D-51, available from HORIBA, Ltd. under the temperature condition of 20° C. The concentration and addition amount of the basic compound is not particularly limited, and have only to be a concentration and addition amount such that the pH of the aqueous dispersion can be adjusted to the above-described range. The pH of the titanium dioxide aqueous dispersion is preferably in a range of 8.5 to 11, and the pH of such a range can achieve high dispersibility of titanium dioxide particles.

The titanium dioxide aqueous dispersion of the present invention having a pH of the above-described range achieves higher dispersibility than the conventional aqueous dispersion having a pH around neutrality. The dispersibility of the aqueous dispersion of the present invention is evaluated by using, as an indicator, the cumulative 50% size (D50) of titanium dioxide particles (secondary particles) in the aqueous dispersion, or the cumulative frequency of particles having a particle size of 1 m or more (this is also referred to as "coarse particle cumulative frequency" in the present application). The D50 and the coarse particle cumulative frequency can be calculated from the particle size distribution of titanium dioxide particles in the aqueous dispersion, measured by using a laser scattering particle size distribution analyzer (LA-950A2, available from HORIBA, Ltd.).

In the titanium dioxide aqueous dispersion of the present invention, the cumulative 50% size (D50) of the secondary particle is preferably 75 nm or less, and more preferably 70 nm or less. Further, the cumulative frequency of secondary particles having a particle size of 1 m or more (coarse particle cumulative frequency) is preferably 10% or less, more preferably 7% or less, and even more preferably 4.5% or less.

In particular, in the titanium dioxide aqueous dispersion of the present invention, preferably, the cumulative 50% size (D50) of the secondary particle is 75 nm or less, and the coarse particle cumulative frequency is 4.5% or less; and more preferably, the D50 is 70 nm or less, and the coarse particle cumulative frequency is 3% or less.

Further, in the titanium dioxide aqueous dispersion of the present invention, the cumulative frequency of the secondary particles having a particle size of 1 m or more (coarse particle cumulative frequency) is preferably 8% or less at the time of addition of electrolyte (specifically, salt).

In general, as the concentration of titanium dioxide particles contained in the aqueous dispersion becomes high, it becomes difficult to reduce the cumulative 50% size (D50) and the coarse particle cumulative frequency. In contrast, in the titanium dioxide aqueous dispersion of the present invention, the effects of combining the following: the surfaces of titanium dioxide particles are treated with a hydrophobic compound; a nonionic surfactant with an HLB value of 10 or more is used as a dispersant; and the pH of the dispersion is adjusted to 8.5 to 13 by using a basic compound allow the D50 and the coarse particle cumulative frequency to be maintained in the above-described preferred numerical range even in the case where titanium dioxide particles are contained at a relatively high concentration (specifically, approximately 25 mass % to 55 mass %). Thus, a highly dispersed titanium dioxide aqueous dispersion can be produced with high efficiency.

In addition, in the titanium dioxide aqueous dispersion of the present invention, the value of the ratio (D50/Da) of the cumulative 50% size of the secondary particle to the average primary particle size (Da) according to the electron micrograph method is preferably 5 or less, more preferably 3.5 or less, and even more preferably 2 or less.

As the basic compound for adjusting the pH of the titanium dioxide aqueous dispersion to the above-described range, alkanolamines are preferably used. Alkanolamines are compounds having a hydroxyl group and an amino group in the alkane skeleton. In the case where an alkanolamine is used, particularly high dispersibility can be achieved in an aqueous dispersion containing titanium dioxide particles coated with a hydrophobic compound and a specific nonionic surfactant. Specifically, the above-described coarse particle cumulative frequency can be made 1% or less. Containing alkanolamine as the basic compound in the aqueous dispersion can be confirmed by a gas chromatography (GC/MS).

The aqueous dispersion of the present invention may contain various types of additives such as a defoamer and a preservative in addition to titanium dioxide particles coated with a hydrophobic compound, the above-described nonionic surfactant, and basic compound. Examples of the defoamer include SOLGEN (registered trademark) 30 of a sorbitan fatty acid ester (available from DKS Co. Ltd.); KM-73, KM-73A, KM-73E, KM-70, KM-72, KM-72F, KM-72S, and KM-72FS of an emulsion type defoamer (all available from Shin-Etsu Chemical Co., Ltd.); and BYK-044 of a silicone-type defoamer (available from BYK). Among these, SOLGEN (registered trademark) 30 is preferred.

The titanium dioxide aqueous dispersion of the present invention can be produced by mixing titanium dioxide particles coated with a hydrophobic compound, an aqueous dispersion medium, a nonionic surfactant having an HLB value of 10 or more, and a basic compound, and controlling the pH of the aqueous dispersion to a range of 8.5 to 13.

The above-described substances can be used for titanium dioxide particles, a hydrophobic compound present on the particle surfaces of the titanium dioxide particles, an aqueous dispersion medium, and a nonionic surfactant having an HLB value of 10 or more, which are used for this production method. In addition, the above-described substances can be used as the basic compound. In particular, in the case where alkanolamine is used as a basic compound, particularly high dispersibility can be achieved in the aqueous dispersion containing titanium dioxide particles coated with a hydrophobic compound and a specific nonionic surfactant. Thus, in this production method, it is desirable to use alkanolamine as a basic compound.

The concentration and addition amount of the basic compound is not particularly limited, and may be such a concentration and addition amount that the above-described pH range can be achieved. In preparation of the aqueous dispersion, the order of mixing the above-described components is not particularly limited, and for the mixing method, well-known methods and device can be employed.

The aqueous dispersion of the present invention may be subjected to wet grinding treatment for the purpose of enhancing the dispersibility of titanium dioxide particles. Wet grinding can be performed by using various types of well-known wet grinders such as a bead mill, and a sand mill. As a grinding media, for example, glass beads and zircon beads can be used.

In the titanium dioxide aqueous dispersion, in which the pH range has been adjusted as described above, the pH may be appropriately readjusted according to uses of a composition to which the aqueous dispersion is applied. For example, in the case where the aqueous dispersion of the present invention is applied to cosmetics, the pH may be adjusted to a range from the weak acid to the weak alkaline (specifically, a range from pH 4.5 to 8.5) by using acidic compounds (e.g., sulfuric acid, hydrochloric acid, nitric acid, acetic acid, carbonic acid, oxalic acid, and phosphoric acid). In the titanium dioxide aqueous dispersion of the present invention, the dispersed state before readjustment can be highly maintained even in the case where the pH is readjusted.

The titanium dioxide aqueous dispersion of the present invention has very high dispersibility, and maintains its highly dispersed state even in the case where an electrolyte (specifically, salt) is added or the pH is changed. Thus, the titanium dioxide aqueous dispersion of the present invention can be preferably used as an aqueous dispersion to be blended to various types of compositions that require high dispersibility (e.g., cosmetics, paints, inks, fibers, pharmaceuticals, and polishing compositions).

A cosmetic that is prepared by using the titanium dioxide aqueous dispersion of the present invention can be produced by mixing an aqueous dispersion, and optional raw materials for cosmetics. As the optional raw material for cosmetics, components can be used such as oil agents, surfactants, moisturizers, higher alcohols, metal ion sequestering agents, natural and synthesized polymers, water-soluble and oil-soluble polymers, ultraviolet shielding agents, various types of extracts, coloring agents including pigments and organic dyes, preservatives, antioxidants, dye stuffs, thickeners, pH regulators, perfumes, cooling agents, antiperspirants, fungicides, skin activators, and various types of powders. A mixture of these components can be made as various types of forms such as a lotion, a cream, a paste, a stick, an emulsion.

A paint that is prepared by using the aqueous dispersion of the present invention can be produced by mixing a titanium dioxide aqueous dispersion with various types of resins (e.g., polyvinyl alcohol resins, vinyl chloride-vinyl acetate copolymer resins, acrylic resins, epoxy resins, urethane resins, alkyd resins, polyester resins, ethylene-vinyl acetate copolymers, acrylic-styrene copolymers, cellulose resins, phenol resins, and amino resins), a solvent, water or the like.

A polishing composition that is prepared by using the aqueous dispersion of the present invention can be produced by mixing, for example, a titanium dioxide aqueous dispersion, an aqueous dispersion medium, an additive for adjusting the pH of the polishing composition (acid or a salt thereof, or a base or a salt thereof), an oxidizing agent for oxidizing the surface of a polishing object, a water-soluble polymer that acts on the surface of the polishing object or the surfaces of abrasive particles, an anticorrosive for suppressing corrosion of the polishing object, a chelate agent, a preservative having other functions, and an antifungal agent.

EXAMPLES

The present invention will be further described in detail based on Examples. The present invention is not limited to these Examples.

Example 1

Spherical-shaped titanium dioxide ultrafine particles (TTO-55(C), available from Ishihara Sangyo Kaisha, Ltd.) were prepared as titanium dioxide particles coated with a hydrophobic compound. The titanium dioxide particles were produced by the "calcination process" described above, the crystalline type was the rutile-type, the average primary particle size measured by the electron micrograph method was 40 nm, and an aspect ratio thereof was 1.3.

The titanium dioxide particles were obtained by the following: coating the surfaces of the particles with aluminum hydroxide ($Al(OH)_3$); and further coating with stearic acid. The coating amount (amount used for coating treatment) of aluminum hydroxide was 3% based on the mass of $TiO_2$, and the coating amount (amount used for coating treatment) of stearic acid was 3% based on the mass of $TiO_2$. The details of the production method of titanium dioxide particles is as described in Example 1 of JPH 07-247119 A.

Further, the lead content in the titanium dioxide particles was measured by using the following measurement method, and thus was less than 3 ppm.

<Measurement Method of Lead Content>

1) Weighing: 0.500 g of a sample (titanium dioxide particles) is weighed and transferred into a 500 ml tall beaker containing 15 g of ammonium sulfate.

2) Dissolution: a small amount of water is added to the beaker to form a slurry, and then 30 ml of sulfuric acid (98%) is added to the slurry. The beaker is covered with a watch glass, and heated on a heater to dissolve the sample.

3) Dilution: after leaving it to cool, approximately 50 ml of water is added thereto and sufficiently mixed, and the total amount of the mixture is then transferred into a 250 ml flask.

4) Constant Volume: the transferred mixture is cooled to room temperature, and then water is added thereto up to the marked line, followed by shaking it up.

5) Determining Content: the solution is measured by using an atomic absorption spectrophotometer (AA-7000, available from Shimadzu Corporation) by the furnace method. The Pb content is determined by the calibration curve created at the same time.

First, 42.95 parts by mass of pure water and 6.75 parts by mass of PEG-11 methyl ether dimethicone serving as a nonionic surfactant as a dispersant (KF-6011: available from Shin-Etsu Chemical Co., Ltd., HLB value: 14.5) were mixed. Then, 45.00 parts by mass of the above-described titanium dioxide particles coated with a hydrophobic compound was gradually introduced therein while the mixed solution was stirred, and sufficiently mixed with a disperser. To this mixture, 0.30 parts by mass of monoethanolamine as a basic compound and 5.00 parts by mass of a sorbitan fatty acid ester as a defoamer (SOLGEN (registered trademark)

30: available from DKS Co. Ltd.) were added, and then ground by using a bead mill (DYNO-MILL MULTI LAB model, available from Shinmaru Enterprises Corporation). The grinding condition was as follows.

Grinding media: zircon beads (ER 120S 0.4/0.6 mm, available from SAINT-GOBAN)

Grinding strength: peripheral speed: 10 m/s, flow rate: 120 ml/min

The pH of the titanium dioxide aqueous dispersion obtained as described above was measured by using a pH meter (D-51, available from HORIBA, Ltd.) under the temperature condition of 20° C., and thus was 9.6.

Example 2

A titanium dioxide aqueous dispersion of Example 2 was obtained in the same manner as in Example 1 except for changing the nonionic surfactant used in Example 1 to PEG-9 dimethicone (KF-6013: available from Shin-Etsu Chemical Co., Ltd., HLB value: 10.0). The pH of the aqueous dispersion was 9.6.

Example 3

A titanium dioxide aqueous dispersion was obtained in the same manner as in Example 1 except for changing the basic compound used in Example 1 to a 17% ammonia aqueous solution (0.62 parts by mass). The pH of the aqueous dispersion was 9.4.

Example 4

A titanium dioxide aqueous dispersion was obtained in the same manner as in Example 1 except for changing the basic compound used in Example 1 to a 20% sodium hydroxide aqueous solution (0.35 parts by mass). The pH of the aqueous dispersion was 9.6.

Example 5

A titanium dioxide aqueous dispersion was obtained in the same manner as in Example 1 except for changing the basic compound used in Example 1 to diethanolamine (0.52 parts by mass). The pH of the aqueous dispersion was 9.3.

Example 6

A titanium dioxide aqueous dispersion was obtained in the same manner as in Example 1 except for changing the basic compound used in Example 1 to triethanolamine (1.1 parts by mass). The pH of the aqueous dispersion was 8.9.

Example 7

A titanium dioxide aqueous dispersion was obtained in the same manner as in Example 1 except for changing the basic compound used in Example 1 to propylamine (0.33 parts by mass). The pH of the aqueous dispersion was 9.6.

Example 8

The titanium dioxide particles used in Example 1 were changed to spindle-shaped titanium dioxide ultrafine particles (TTO-S-4, available from Ishihara Sangyo Kaisha, Ltd.). The titanium dioxide particles were produced by the "wet process" described above, the crystalline type was the rutile-type, the average primary particle size measured by the electron micrograph method was 15 nm, and an aspect ratio thereof was 6.1. The lead content in the titanium dioxide particles measured by an atomic absorption spectrophotometer (AA-7000, available from Shimadzu Corporation) was less than 3 ppm.

The surfaces of the titanium dioxide particles were coated with aluminum hydroxide ($Al(OH)_3$), and further coated with stearic acid. The coating amount (amount used for coating treatment) of aluminum hydroxide was 13.0% based on the mass of $TiO_2$, and the coating amount (amount used for coating treatment) of stearic acid was 10.5% based on the mass of $TiO_2$.

A titanium dioxide aqueous dispersion was obtained in the same manner as in Example 1 except for using the titanium dioxide particles coated with a hydrophobic compound mentioned above. The pH of the aqueous dispersion was 9.2.

Example 9

The titanium dioxide particles used in Example 1 were changed to titanium dioxide ultrafine particles having a spherical shape and a relatively small particle size (TTO-51(C), available from Ishihara Sangyo Kaisha, Ltd.). The titanium dioxide particles were produced by the "calcination process" described above, the crystalline type was the rutile-type, the average primary particle size measured by the electron micrograph method was 20 nm, and an aspect ratio thereof was 2.4. The lead content in the titanium dioxide particles measured by an atomic absorption spectrophotometer (AA-7000, available from Shimadzu Corporation) was less than 3 ppm.

The surfaces of the titanium dioxide particle were coated with aluminum hydroxide ($Al(OH)_3$), and further coated with stearic acid. The coating amount (amount used for coating treatment) of aluminum hydroxide was 13.3% based on the mass of $TiO_2$, and the coating amount (amount used for coating treatment) of stearic acid was 4.8% based on the mass of $TiO_2$.

First, 60.13 parts by mass of pure water and 7.34 parts by mass of PEG-11 methyl ether dimethicone of a nonionic surfactant as a dispersant (KF-6011: available from Shin-Etsu Chemical Co., Ltd., HLB value: 14.5) were mixed. Then, 24.46 parts by mass of the above-described titanium dioxide particles coated with a hydrophobic compound was gradually introduced therein while the mixed solution was stirred, and sufficiently mixed with a disperser. To this mixture, 0.25 parts by mass of monoethanolamine as a basic compound and 7.83 parts by mass of a sorbitan fatty acid ester as a defoamer (SOLGEN (registered trademark) 30: available from DKS Co. Ltd.) were added, and then ground by using a bead mill (DYNO-MILL MULTI LAB model, available from Shinmaru Enterprises Corporation). The grinding condition was the same as the case of Example 1. Thus, a titanium dioxide aqueous dispersion was obtained. The pH of the aqueous dispersion was 8.9.

Example 10

The titanium dioxide particles used in Example 1 were changed to titanium dioxide ultrafine particles having a spherical shape and a relatively large particle size (MPT-142, available from Ishihara Sangyo Kaisha, Ltd.). The titanium dioxide particles were produced by the "calcination process" described above, the crystalline type was the rutile-type, the average primary particle size by the electron micrograph method was 80 nm, and an aspect ratio thereof was 1.2. The lead content in the titanium dioxide particles measured by an atomic absorption spectrophotometer (AA-7000, available from Shimadzu Corporation) was less than 3 ppm.

The surfaces of the titanium dioxide particle were coated with aluminum hydroxide (Al(OH)$_3$), and further coated with stearic acid. The coating amount (amount used for coating treatment) of aluminum hydroxide was 2.1% based on the mass of TiO$_2$, and the coating amount (amount used for coating treatment) of stearic acid was 1.2% based on the mass of TiO$_2$. A titanium dioxide aqueous dispersion was obtained in the same manner as in Example 1 except for using such titanium dioxide particles. The pH of the aqueous dispersion was 9.7.

Example 11

The nonionic surfactant used in Example 1 was changed to polyoxyethylene sorbitan monooleate (Tween 60: available from Tokyo Chemical Industry Co., Ltd., HLB value: 15.0). A titanium dioxide aqueous dispersion of Example 11 was obtained in the same manner as in Example 1 except the above-described change. The pH of the aqueous dispersion was 9.2.

Example 12

The nonionic surfactant used in Example 1 was changed to polyoxyalkylene decylether (NOYGEN (registered trademark) XL-140: available from DKS Co. Ltd., HLB value: 15.9). A titanium dioxide aqueous dispersion of Example 12 was obtained in the same manner as in Example 1 except the above-described change. The pH of the aqueous dispersion was 9.0.

Example 13

The nonionic surfactant used in Example 1 was changed to polyoxyethylene tridecylether (NOYGEN (registered trademark) TDS-120: available from DKS Co. Ltd., HLB value: 14.8). A titanium dioxide aqueous dispersion of Example 13 was obtained in the same manner as in Example 1 except the above-described change. The pH of the aqueous dispersion was 9.0.

Example 14

The nonionic surfactant used in Example 1 was changed to polyoxyethylene styrenated phenyl ether (NOYGEN (registered trademark) EA-177: available from DKS Co. Ltd., HLB value: 15.6). A titanium dioxide aqueous dispersion of Example 14 was obtained in the same manner as in Example 1 except the above-described change. The pH of the aqueous dispersion was 9.1.

Example 15

The nonionic surfactant used in Example 1 was changed to polyoxyethylene styrenated phenyl ether (NOYGEN (registered trademark) EA-157: available from DKS Co. Ltd., HLB value: 14.3). A titanium dioxide aqueous dispersion of Example 15 was obtained in the same manner as in Example 1 except the above-described change. The pH of the aqueous dispersion was 9.1.

Example 16

Titanium dioxide particles were prepared through the following method, by using the titanium dioxide particles of Example 1 as a basic constitution, but changing the fatty acid coating from stearic acid to lauric acid.

A titanium tetrachloride aqueous solution (200 g/l in terms of TiO$_2$) was neutralized with a sodium hydroxide aqueous solution while the aqueous solution was maintained at room temperature to deposit colloidal amorphous titanium hydroxide, followed by aging to obtain a rutile-type titania sol. The sol was filtered and washed. The resulting washed cake was calcined at 600° C. for 3 hours, and then wet grinding was performed by using a sand mill, thus obtaining a slurry of titanium dioxide particles.

The slurry was heated to 80° C. Then, 4 mass % of sodium aluminate based on titanium dioxide (in terms of Al$_2$O$_3$) was added while maintaining the temperature and stirring well. The pH of the slurry was adjusted to 7.5 to 8.5 by using a 20 mass % sulfuric acid, thereby coating titanium dioxide particles with aluminum hydroxide (Al(OH)$_3$). Further, the pH of the slurry was adjusted to approximately 5 by using the 20 mass % sulfuric acid. Then, 5 mass % of sodium laurate based on titanium dioxide (in terms of lauric acid) was added, then stirred and mixed for approximately 1 hour. Thereafter, the temperature of the slurry was cooled to 50° C. or lower. This was filtered, washed, and dried, followed by grinding with a hammer type mill, and thus titanium dioxide particles coated with lauric acid were obtained. The lead content in the titanium dioxide particles was less than 3 ppm.

A titanium dioxide aqueous dispersion of Example 16 was obtained by using the above-described titanium dioxide particles coated with lauric acid in the same manner as in Example 1. The pH of the aqueous dispersion was 9.1. In Example 16, the amounts of respective components blended were slightly changed as follows.

Pure water: 60.0 parts by mass
PEG-11 methyl ether dimethicone: 4.5 parts by mass
Titanium dioxide particles: 30.0 parts by mass
Monoethanolamine: 0.5 parts by mass
Sorbitan fatty acid ester: 5.0 parts by mass Example 17

Titanium dioxide particles coated with oleic acid were obtained by using the titanium dioxide particles of Example 1 as a basic constitution in the same manner as in Example 16, except for changing the sodium laurate used in Example 16 to sodium oleate. The lead content in the titanium dioxide particles coated with oleic acid was less than 3 ppm.

A titanium dioxide aqueous dispersion was obtained by using the titanium dioxide particles coated with oleic acid in the same manner as in Example 1. The pH of the aqueous dispersion was 9.1. The amounts of respective components of the aqueous dispersion of Example 17 were the same as those of Example 16.

Comparative Example 1-1

A titanium dioxide aqueous dispersion was obtained in the same manner as in Example 1 except for omitting addition of the basic compound used in Example 1 (monoethanolamine) and replacing the basic compound that was not added (0.3 parts by mass) with pure water. The pH of the aqueous dispersion was 6.3.

Comparative Example 1-2

A titanium dioxide aqueous dispersion was obtained in the same manner as in Example 9 except for omitting addition of the basic compound used in Example 9 (monoethanolamine) and replacing the basic compound that was not added (0.25 parts by mass) with pure water. The pH of the aqueous dispersion was 5.4.

Comparative Example 2

The nonionic surfactant used in Example 1 was changed to PEG-32 methyl ether dimethicone (KF-6004: available from Shin-Etsu Chemical Co., Ltd., HLB value: 9.0) having a low HLB value. An attempt was made to produce a titanium dioxide aqueous dispersion in the same manner as in Example 1 except the above-described change, but the resultant was a paste and could not be dispersed. Thus, a titanium dioxide aqueous dispersion could not be obtained.

Comparative Example 3

Titanium dioxide particles were obtained in the same manner as in Example 16 except for not adding sodium laurate in Example 16.

An attempt was made to produce a titanium dioxide aqueous dispersion in the same manner as in Example 1 except for using the titanium dioxide particles, but the resultant was a paste and could not be dispersed. Thus, a titanium dioxide aqueous dispersion could not be obtained.

(Evaluation of Dispersibility)

Various types of data serving as an indicator of dispersibility were collected by the following methods for the purpose of evaluating the dispersibility of titanium dioxide aqueous dispersions of the above-described various types of Examples and Comparative Examples.

(Secondary Particle Size (D50))

The particle size distribution of particle size (secondary particle size) of titanium dioxide particles in each of the aqueous dispersions of various types of Examples and Comparative Examples was measured by using a laser scattering particle size distribution analyzer (LA-950A2, available from HORIBA, Ltd.). In the measurement, the refractive index of the dispersion medium (water) was 1.33, and the refractive index of titanium dioxide was 2.75. Using ion exchanged water as a solvent, each of the aqueous dispersions of Examples or Comparative Examples was added such that the transmittance (R) was in a range of 75 to 85% to prepare a measurement sample. Measurement was performed under the conditions of a circulation speed of 5, a stirring strength of 3, and no ultrasonic irradiation.

The cumulative 50% size (median size) on a volume basis in the particle size distribution was calculated, and this was determined as the secondary particle size (D50) in the titanium dioxide aqueous dispersion. A smaller value of the secondary particle size (D50) is understood as providing better dispersibility of titanium dioxide particles in the aqueous dispersion.

(Coarse Particle Cumulative Frequency)

In the particle size distribution measured by the above-described method, the cumulative frequency (%) of titanium dioxide particles having a particle size (secondary particle size) of 1 m or more was calculated, and this was determined as the coarse particle cumulative frequency in the titanium dioxide aqueous dispersion. A smaller value of the coarse particle cumulative frequency is understood as providing better dispersibility of titanium dioxide particles in the aqueous dispersion.

(Evaluation of Influence of Electrolyte)

The influence of the electrolyte on the dispersibility was evaluated in the case where an electrolyte (specifically, salt) was added to the aqueous dispersions of various types of Examples and Comparative Examples. However, the evaluation results for Examples 2 and 12 are not shown in Table 1.

Specifically, sodium chloride was added to each of the titanium dioxide aqueous dispersions of various types of Examples and Comparative Examples such that the concentration of salt in the aqueous dispersion was 4 mass %. For the aqueous dispersion after addition of sodium chloride, data of the secondary particle size (D50) and the coarse particle cumulative frequency were collected by a method same as the above-described method.

Evaluation results for the dispersibility of the aqueous dispersion and influence of the electrolyte are shown in Table 1. However, the evaluation results for Example 10 and Comparative Examples 2 and 3 are not shown in Table 1. In the alphabetical expressions of the basic compounds in Table 1, MEA denotes monoethanolamine, DEA denotes diethanolamine, TEA denotes triethanolamine, and PA denotes propylamine.

TABLE 1

| | Nonionic surfactant | | Basic compound | pH | Particle shape | Average Primary Particle | | Dispersibility (before salt addition) | | Dispersibility (at the time of salt addition) | |
|---|---|---|---|---|---|---|---|---|---|---|---|
| | Product No | HLB value | | | | Size (nm) | Hydrophobic compound | D50 (μm) | Coarse particle cumulative frequency (%) | D50 (μm) | Coarse particle cumulative frequency (%) |
| Example 1 | KF-6011 | 14.5 | MEA | 9.6 | Spherical | 40 | Stearic acid | 0.066 | 0 | 0.065 | 2 |
| Example 2 | KF-6013 | 10 | MEA | 9.6 | Spherical | 40 | Stearic acid | 0.073 | 1.8 | — | — |
| Example 3 | KF-6011 | 14.5 | NH$_3$ | 9.4 | Spherical | 40 | Stearic acid | 0.067 | 1.8 | 0.066 | 5.1 |
| Example 4 | KF-6011 | 14.5 | NaOH | 9.6 | Spherical | 40 | Stearic acid | 0.066 | 1.2 | 0.066 | 4.9 |
| Example 5 | KF-6011 | 14.5 | DEA | 9.3 | Spherical | 40 | Stearic acid | 0.065 | 0 | 0.066 | 1.6 |
| Example 6 | KF-6011 | 14.5 | TEA | 8.9 | Spherical | 40 | Stearic acid | 0.065 | 0 | 0.065 | 1.1 |
| Example 7 | KF-6011 | 14.5 | PA | 9.6 | Spherical | 40 | Stearic acid | 0.068 | 4.6 | 0.067 | 5.7 |
| Example 8 | KF-6011 | 14.5 | MEA | 9.2 | Spindle | 15 | Stearic acid | 0.062 | 0 | 0.063 | 6.2 |
| Example 9 | KF-6011 | 14.5 | MEA | 8.9 | Spherical | 20 | Stearic acid | 0.967 | 9.6 | 0.067 | 7.6 |
| Example 11 | Tween 60 | 15.0 | MEA | 9.2 | Spherical | 40 | Stearic acid | 0.064 | 0 | 0.070 | 0.3 |
| Example 12 | XL-140 | 15.9 | MEA | 9.0 | Spherical | 40 | Stearic acid | 0.063 | 0 | — | — |
| Example 13 | TDS-120 | 14.8 | MEA | 9.0 | Spherical | 40 | Stearic acid | 0.063 | 0 | 0.065 | 6.5 |
| Example 14 | EA-177 | 15.6 | MEA | 9.1 | Spherical | 40 | Stearic acid | 0.064 | 0 | 0.066 | 0.8 |

TABLE 1-continued

|  | Nonionic surfactant | | Basic compound | Particle pH shape | Average Primary Particle Size (nm) | Hydrophobic compound | Dispersibility (before salt addition) | | Dispersibility (at the time of salt addition) | |
|---|---|---|---|---|---|---|---|---|---|---|
|  | Product No | HLB value |  |  |  |  | D50 (μm) | Coarse particle cumulative frequency (%) | D50 (μm) | Coarse particle cumulative frequency (%) |
| Example 15 | EA-157 | 14.3 | MEA | 9.1 Spherical | 40 | Stearic acid | 0.063 | 0 | 0.063 | 0 |
| Example 16 | KF-6011 | 14.5 | MEA | 9.1 Spherical | 40 | Lauric acid | 0.065 | 0 | 0.072 | 7.3 |
| Example 17 | KF-6011 | 14.5 | MEA | 9.1 Spherical | 40 | Oleic acid | 0.064 | 0 | 0.071 | 4.3 |
| Comparative Example 1-1 | KF-6011 | 14.5 | None | 6.3 Spherical | 40 | Stearic acid | 0.073 | 4.8 | 0.074 | 8.4 |
| Comparative Example 1-2 | KF-6011 | 14.5 | None | 5.4 Spherical | 20 | Stearic acid | 0.072 | 18.2 | 0.075 | 24.1 |

In Table 1, firstly, attention is focused on Examples 1 and 2, and Comparative Example 1-1. It is found that, in the titanium dioxide aqueous dispersions of Examples 1 and 2, the secondary particle size (D50) in a state in which an electrolyte (specifically, salt) is not added (before salt addition) is equal or less than that of Comparative Example 1-1. Further, it is also found that the coarse particle cumulative frequency is smaller than that of the aqueous dispersion of Comparative Example 1-1. Thus, in the titanium dioxide aqueous dispersions of Examples 1 and 2, the dispersibility is enhanced compared to the aqueous dispersion of Comparative Example 1-1. This can be understood as being attributed to the presence of the basic compound in the aqueous dispersion and the pH (in the range of 8.5 to 13) of the aqueous dispersion due to the basic compound.

In particular, in the aqueous dispersion of Example 1, the coarse particle cumulative frequency in a state in which an electrolyte (specifically, salt) is not added (before salt addition) is a very small value (specifically, the frequency is 0%). From the comparison with Example 2, this is thought to be attributed to use of a nonionic surfactant having a high HLB value (specifically, 13 or more) in addition to the above-described factor.

It is found that, in a state in which an electrolyte (specifically, salt) was added (at the time of salt addition), the aqueous dispersion of Example 1 highly maintains the dispersed state before electrolyte (specifically, salt) addition. This can be understood as being attributed to use of a nonionic surfactant having a high HLB value (specifically, 13 or more).

In Examples 1 and 2, PEG-11 methyl ether dimethicone and PEG-9 dimethicone are respectively used as a nonionic surfactant. However, it is found that a highly dispersed state can be similarly maintained even in the case of using another nonionic surfactant having the same level of HLB value (Examples 11 to 15). Further, in Examples 1 and 2, stearic acid was used as a hydrophobic compound. However, it is found that a highly dispersed state can be similarly maintained even in the case of using another fatty acid (lauric acid or oleic acid) (Examples 16 and 17). In fact, in Examples 11 to 17, the secondary particle size (D50) and the coarse particle cumulative frequency in a state in which an electrolyte (specifically, salt) is not added (before salt addition) are smaller than those of the aqueous dispersion of Comparative Example 1-1 similarly to Example 1 (in particular, the coarse particle cumulative frequency is 0%, which is very small similarly to Example 1); and the secondary particle size (D50) and the coarse particle cumulative frequency in a state in which an electrolyte (specifically, salt) was added (at the time of salt addition) are also smaller than the secondary particle size (D50) and the coarse particle cumulative frequency of the aqueous dispersion of Comparative Example 1-1 in a state in which an electrolyte (specifically, salt) was added (at the time of salt addition) similarly to Example 1.

Next, attention is focused on Example 1 and Examples 3 to 7. In these Examples, various types of compounds were used for the basic compound for adjusting the pH of the titanium dioxide aqueous dispersion to the above-described predetermined range. It is found that, in any of these Examples, the values of the secondary particle size (D50) and the coarse particle cumulative frequency were sufficiently small, and high dispersibility could be obtained. It is found that this high dispersibility can be highly maintained even in a state in which an electrolyte (specifically, salt) was added (at the time of salt addition). In fact, in Example 1 and Examples 3 to 7, the secondary particle size (D50) and the coarse particle cumulative frequency in a state in which an electrolyte (specifically, salt) is not added (before salt addition) are smaller than the secondary particle size (D50) and the coarse particle cumulative frequency of Comparative Example 1-1 in a state in which an electrolyte (specifically, salt) is not added (before salt addition); and the secondary particle size (D50) and the coarse particle cumulative frequency in a state in which an electrolyte (specifically, salt) was added (at the time of salt addition) are also smaller than the secondary particle size (D50) and the coarse particle cumulative frequency of the aqueous dispersion of Comparative Example 1-1 in a state in which an electrolyte (specifically, salt) was added (at the time of salt addition).

Here, particularly in the titanium dioxide aqueous dispersions of Example 1, 5, and 6, the value of the coarse particle cumulative frequency is very small regardless of whether the electrolyte (specifically, salt) is added (specifically, the frequency is 0% before electrolyte (specifically, salt) addition, and 2% or less even at the time of electrolyte (salt) addition). This can be understood as being attributed to use of an alkanolamine-based compound as the basic compound.

Further, focusing on Example 8, it is found that high dispersibility can be exerted similarly to the above-described various types of Examples even in the case of using titanium dioxide particles having a shape other than a spherical shape, such as a spindle shape.

Moreover, focusing on Example 9, it is found that high dispersibility can be exerted similarly to the above-described various types of Examples even in the case of using, as titanium dioxide particles, those having a relatively small particle size (average primary particle size). In fact, in Example 9, the secondary particle size (D50) and the coarse particle cumulative frequency before electrolyte (specifically, salt) addition are smaller than the secondary particle size (D50) and the coarse particle cumulative frequency of the aqueous dispersion of Comparative Example 1-2 (using titanium dioxide particles having a small particle size that is the same as the particle size of Example 9), and this tendency is the same at the time of electrolyte (specifically, salt) addition. In Example 9, the coarse particle cumulative frequency before electrolyte (specifically, salt) addition is larger than that of Comparative Example 1-1. This is because the titanium dioxide particles used in Example 9 are spherical-shaped particles produce by the "calcination method" described above, and the particle size (average primary particle size) thereof is smaller than the size of particles used in Comparative Example 1-1, so that particles are likely to agglomerate in the solution, thereby easily causing coarse particles. Further, in Example 10, it was found that a similar effect could be obtained even in the case where titanium dioxide particles having a relatively large particle size (i.e., average primary particle size) were used as the titanium dioxide particles (data not shown).

(Evaluation of Influence of pH Change)

The influence on the dispersibility was evaluated in the case where the pH of the titanium dioxide aqueous dispersion of Example was changed. Specifically, in Example 1 as a representative example, sulfuric acid was added to the aqueous dispersion so that the pH of the aqueous dispersion was 9, 7, and 3. For each of the aqueous dispersions, the pH of which has been adjusted to each value, data of the secondary particle size (D50) and the coarse particle cumulative frequency were collected by a method same as the above-described method. The results are shown in Table 2.

TABLE 2

| | Dispersibility (normal time) | | | | | |
|---|---|---|---|---|---|---|
| | pH 9.6 → pH 9 | | pH 9 → pH 7 | | pH 7 → pH 3 | |
| | D50 (μ) | Coarse particle cumulative frequency (%) | D50 (μ) | Coarse particle cumulative frequency (%) | D50 (μ) | Coarse particle cumulative frequency (%) |
| Example 1 | 0.066 | 0 | 0.065 | 0 | 0.068 | 0 |

As shown in Table 2, it is found that the aqueous dispersion of Example 1 highly maintains the secondary particle size(1D50) and the coarse particle cumulative frequency in the initial pH, and maintains high dispersibility even in the case where the pH is changed. Such a tendency is not limited to Example 1, but similarly applied to other Examples (data not shown).

The aqueous dispersions of Comparative Examples 1-1 and 1-2 similarly maintain the initial dispersibility in the case where the pH is changed (data not shown). Meanwhile, as described above, the dispersibility in the initial pH is more excellent in the aqueous dispersion of the Examples, and thus the dispersibility of the aqueous dispersion after the pH change is also more excellent in the Examples.

(Evaluation of Transmittance Characteristics)

The visible light transparency and ultraviolet shielding properties (here, these two properties are comprehensively referred to as transmittance characteristics) of the aqueous dispersions of various types of Examples and Comparative Examples were evaluated by the following method.

A 10,000-fold diluted solution of each of the aqueous dispersions of various types of Examples and Comparative Examples were prepared. Specifically, approximately 1 g of sample was precisely weighed, and 100-fold diluted by addition of ion exchanged water, and the diluted solution was then sufficiently stirred. Further, 1 g of this diluent was collected and 100-fold diluted by addition of ion exchanged water, followed by stirring to prepare a test sample.

Each of these samples was placed in a 10 mm square quartz cell, and the absorbance at a wavelength of 300 nm to 750 nm (visible light to ultraviolet light region) was measured by using a spectrophotometer (V-660, available from JASCO Corporation). The results are shown in Table 3. Table 3 shows the absorbance (A) at a wavelength of 550 nm as a representative absorbance in the visible light region, the absorbance (B) at a wavelength of 350 nm as a representative absorbance in the ultraviolet light A region, and the absorbance (C) at a wavelength of 300 nm as a representative absorbance in the ultraviolet light B region. Further, Table 3 shows the ratios ((B)/(A) and (C)/(A)) of the absorbance in the ultraviolet light region to the absorbance in the visible light region.

TABLE 3

| | Absorbance | | | | |
|---|---|---|---|---|---|
| | 550 nm (A) | 350 nm (B) | 300 nm (C) | (B)/(A) | (C)/(A) |
| Example 1 | 0.14 | 1.14 | 2.09 | 8.14 | 14.93 |
| Example 3 | 0.14 | 1.10 | 1.95 | 7.86 | 13.93 |
| Example 4 | 0.14 | 1.13 | 2.03 | 8.07 | 14.50 |
| Example 5 | 0.14 | 1.16 | 2.09 | 8.29 | 14.93 |
| Example 6 | 0.14 | 1.18 | 2.11 | 8.43 | 15.07 |
| Example 7 | 0.15 | 1.12 | 1.96 | 7.47 | 13.07 |

TABLE 3-continued

| | Absorbance | | | | |
|---|---|---|---|---|---|
| | 550 nm (A) | 350 nm (B) | 300 nm (C) | (B)/(A) | (C)/(A) |
| Example 11 | 0.15 | 1.18 | 2.00 | 8.09 | 13.75 |
| Example 12 | 0.12 | 1.20 | 2.34 | 9.92 | 19.37 |
| Example 13 | 0.13 | 1.20 | 2.27 | 9.46 | 17.93 |
| Example 14 | 0.15 | 1.24 | 2.06 | 8.06 | 13.42 |
| Example 15 | 0.12 | 1.17 | 2.27 | 9.89 | 19.21 |
| Example 16 | (0.09) | (0.76) | (1.27) | 8.84 | 14.78 |
| Example 17 | (0.09) | (0.78) | (1.30) | 8.81 | 14.72 |
| Comparative Example 1-1 | 0.17 | 1.12 | 1.69 | 6.59 | 9.94 |

As shown in Table 3, it is found that in the titanium dioxide aqueous dispersions of the present Examples (Examples 1 to 15 in which the concentration of titanium dioxide particles is 45 mass %, which is the same as that of Comparative Example 1-1), the absorbance (A) in the visible light region is lower than that of the aqueous dispersion of Comparative Example 1-1, and the transparency of visible light is high. Meanwhile, the absorbance ((B) or (C)) in the ultraviolet light region is high, and this shows that the ultraviolet shielding property is high. Such transmittance characteristics can be seen from the values of the ratios ((B)/(A) and (C)/(A)) of the absorbance in the ultraviolet light region to the absorbance in the visible light region in Examples being larger than those of Comparative Example 1-1. In Examples 16 and 17, the concentration of titanium dioxide in the original aqueous dispersion is slightly lower than that of other Examples and Comparative Examples, and thus the absorbance is a reference value. However, it is found that the value of the absorbance ratio is larger than that of Comparative Example 1-1.

In other words, it is found that the titanium dioxide aqueous dispersion of the present invention has the above-described high dispersibility, whereby favorable visible light transparency and high ultraviolet shielding properties are achieved.

INDUSTRIAL APPLICABILITY

The titanium dioxide aqueous dispersion of the present invention has high dispersibility and maintains its high dispersed state even in the case where an electrolyte (specifically, salt) is added or the pH is changed. Thus, the titanium dioxide aqueous dispersion of the present invention is useful as a titanium dioxide aqueous dispersion for blending various types of compositions that require high dispersibility.

The invention claimed is:

1. A titanium dioxide aqueous dispersion comprising:
a titanium dioxide particle having a hydrophobic compound on the surface, wherein the hydrophobic compound is stearic acid or a salt of the stearic acid,
an aqueous dispersion medium,
a nonionic surfactant having an HLB value of 10 or more, and
a basic compound of alkanolamine, wherein a pH of the titanium dioxide aqueous dispersion is in a range of 8.5 to 13.

2. The titanium dioxide aqueous dispersion according to claim 1, wherein the titanium dioxide particle contains lead as an impurity, and a content of the lead is 3 ppm or less.

3. The titanium dioxide aqueous dispersion according to claim 1, wherein the titanium dioxide particle is a spherical-shaped particle having an aspect ratio of 3 or less.

4. The titanium dioxide aqueous dispersion according to claim 1, wherein the titanium dioxide particle has the hydrophobic compound on the surface of the titanium dioxide particle being coated with an oxide or a hydroxide of at least one type of zinc, titanium, cerium, iron, silicon, and aluminum.

5. A method for producing a titanium dioxide aqueous dispersion, comprising:
mixing a titanium dioxide particle having a hydrophobic compound on the surface, an aqueous dispersion medium, a nonionic surfactant having an HLB value of 10 or more, and a basic compound of alkanolamine to bring a pH of the aqueous dispersion into a range of 8.5 to 13 to produce the titanium dioxide aqueous dispersion, wherein the hydrophobic compound is stearic acid or a salt of the stearic acid.

6. The method according to claim 5, wherein the titanium dioxide particle contains lead as an impurity, and a content of the lead is 3 ppm or less.

7. The method according to claim 5, wherein the titanium dioxide particle is a spherical-shaped particle having an aspect ratio of 3 or less.

8. The titanium dioxide aqueous dispersion according to claim 2, wherein the titanium dioxide particle is a spherical-shaped particle having an aspect ratio of 3 or less.

9. The method according to claim 5, wherein the titanium dioxide particle has the hydrophobic compound on the surface of the titanium dioxide particle being coated with an oxide or a hydroxide of at least one type of zinc, titanium, cerium, iron, silicon, and aluminum.

10. The titanium dioxide aqueous dispersion according to claim 2, wherein the titanium dioxide particle has the hydrophobic compound on the surface of the titanium dioxide particle being coated with an oxide or a hydroxide of at least one type of zinc, titanium, cerium, iron, silicon, and aluminum.

11. The titanium dioxide aqueous dispersion according to claim 3, wherein the titanium dioxide particle has the hydrophobic compound on the surface of the titanium dioxide particle being coated with an oxide or a hydroxide of at least one type of zinc, titanium, cerium, iron, silicon, and aluminum.

* * * * *